Oct. 17, 1961  R. E. WILSON  3,004,707
PULSE CENTER DETERMINING SYSTEM
Filed Nov. 17, 1955  2 Sheets-Sheet 1

INVENTOR.
ROBERT E. WILSON
BY
J.D. O'Brien
H. H. Loscke
ATTYS

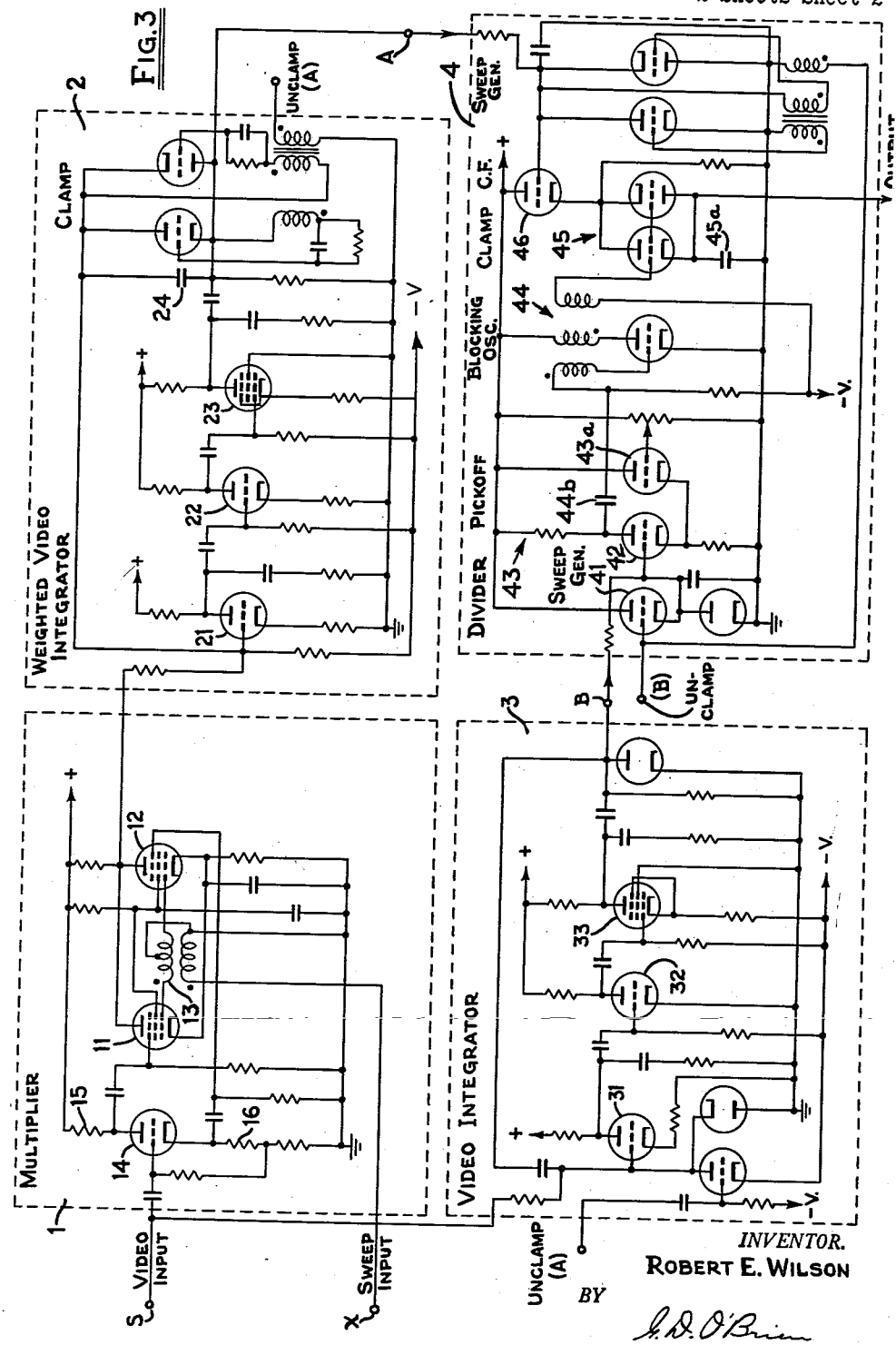

3,004,707
PULSE CENTER DETERMINING SYSTEM
Robert E. Wilson, Moorestown, N.J., assignor, by mesne assignments to the United States of America as represented by the Secretary of the Navy
Filed Nov. 17, 1955, Ser. No. 547,586
2 Claims. (Cl. 235—183)

This invention relates to an automatic tracking system, and is particularly directed to means for accurately detecting elemental changes in the time phase of repetitive radar signals reflected from a moving actual target.

The term "automatic tracking" contemplates a system in which movement in space of an actual target with respect to the line of sight of a radar set causes a shift in the position of a radar pulse along a time base line, the time function usually begin represented by a voltage or current which varies linearly with time, such as the ramp of a conventional sawtooth wave. The starting point of the ramp of the sawtooth must of course be precisely synchronized with the beginning of the time period within which the radar pulse is to be inspected. Then the time phase of the pulse, and the position in space of the actual target, is determined simply by measuring the amplitude of the ramp voltage at the instant of receipt of the radar pulse. This measured voltage, in automatic systems, may be compared with that of an output voltage store, and the difference may be employed as a servo control voltage to correct the output store. Incremental changes in this measured voltage, caused by movement of the actual target, are detected and used to cause the output store voltage to follow. Unfortunately, the radar signal received from the actual target does not have the clearly defined boundaries and mid-point of the transmitted pulse. The distortions of the signal are aggravated by each circuit it must traverse, and the desired wave fronts are usually distorted in the first few stages of amplification because of noise.

The object of this invention is an improved discriminator or detector for detecting the electrical center of a video signal and determining the position of this electrical center along a time-base line.

Other objects of this invention will become apparent by referring to the specific embodiment described in the following specification and shown in the accompanying drawing in which:

FIG. 3 is a circuit diagram of the discriminator of FIG. 2, and

Figure 1:
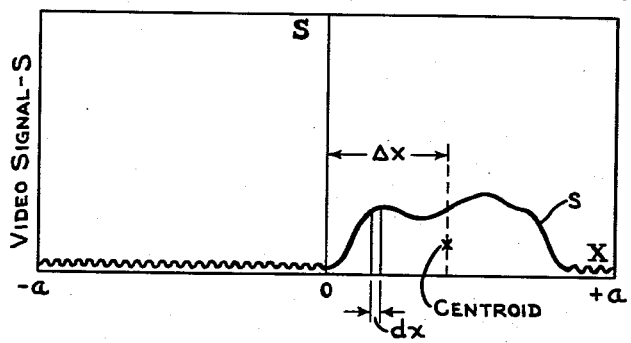
FIG. 1 is the plot of a typical video signal along a time-base X.

In order to accurately locate an actual target by radar, it is advantageous to use all of the radar return (hits) received on one azimuth scan. These hits are relatively widely spaced in time. In one type of tracking equipment, to which this invention is applicable, the radar data is placed on a storage tube thereby allowing the area about the expected target location to be scanned and thereby reading out successive returns essentially simultaneously. This system facilitates coordinate conversion, and such read-out from the storage tube may be performed in any desired set of coordinates, such as R—θ or X—Y. All of the actual targets in the hemisphere or in a segment of the hemisphere may be represented on a plane surface such as the screen of a cathode ray tube or on the storage surface of a "radechon" type storage tube. Such a storage tube is described in the Radio Corporation of America Review for March 1948, vol 14, No. 1. For example, radar return energy may be detected and "written" with an electron beam on the surface of the storage tube in PPI form. When a target, selected possibly from among several targets represented on the storage surface, is to be tracked, its image on the storage surface is framed with a small rectangular raster and scanned by the electron beam deflected in two dimensions by two sawtooth voltages. If the storage tube target moves a distance $\Delta x$ from the estimated, or tracked coordinates, the video signal produced in the read-out scanning beam will be displaced in time along a time-baseline X an amount corresponding to $\Delta x$ as represented in FIG. 1. Displacement in the Y direction can be similarly represented. If the video signal envelope, $s$, is irregular in shape because of noise and distorting influences in the transmitting and receiving channels of the radar it then becomes difficult to determine the electrical center, or centroid, of the signal. Until this centroid, which colloquially may be referred to as the center of gravity of the signal, is found, the displacement, $\Delta x$, from the center of the raster cannot be found. If $\Delta x$ is in error, servo voltage for centering the raster over its target will be in error.

According to an important feature of this invention, the $\Delta x$ is electrically determined by dividing a voltage corresponding to the area under the signal envelope, $s$, into a voltage corresponding to the summation of the moments of the incremental areas under the envelope about the ordinate O—S. That is;

$$\Delta x = \frac{\int_{-a}^{+a}(sx)dx}{\int_{-a}^{+a}sdx}$$

where $\Delta x$ is the required correction voltage, $s$ is the video signal, $x$ is the distance from the center of the raster along the X axis, and $a$ is one-half the dimension of the raster in the X direction. It will be noted that the divisor of the term above is the summation of the incremental areas, $sdx$, under the envelope $s$ which is the total area under the envelope. The dividend is the summation of the moments of these incremental areas at distances, $s$, from the ordinate O—S. By dividing the area into the moments expression, the distance, $\Delta x$, to the centroid is obtained.

Accordingly, a sweep voltage having a voltage ramp that changes linearaly with time from a value of $-a$ through 0 to a value of $+a$, is generated and employed to deflect the beam from $-a$ to $+a$. During this raster scan the beam is unblanked and the video signal read out. The discriminator, of this invention, measures any error in the output by comparing the timing of the reading signal with that of the raster sweep waveform.

Figure 2:
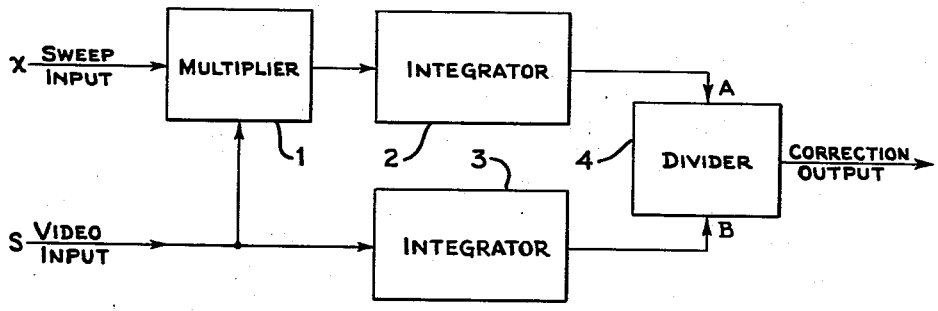
FIG. 2 is a block diagram of a discriminator embodying this invention.

This discriminator, shown in block diagram in FIG. 2, comprises a multiplier circuit 1, integrators 2 and 3 and divider circuit 4. Input voltages to the discriminator are the sweep voltage, $x$, and the video signal, $s$. These two voltages are applied to multiplier 1. At the output of the multiplier appears a voltage analogous to the product of the video voltage and the sweep voltage, which is the $sx$ term of the above equation. Coupled to the output of the multiplier 1 is the first integrator 2, which, if desired, may comprise a simple resistor-capacity network with a time constant long compared to one frame time. The result of the integration must be sampled at the end of each frame and then zeroed for the start of the next frame. A frame-time synchronizing pulse is, of course, necessary for this purpose.

In the second integrator 3 the signal, $s$, alone is integrated over the sweep time from $-a$ to $+a$.

The divider 4 divides the output of the integrator 3 into the voltage at the output of the integrator 2 so that the output of the divider is a voltage proportional to the correction voltage. Δx. Division may be performed in a number of known circuits. One circuit is described by John Broomall and Leon Riebman in the paper entitled "A Sampling Analogue Computer" presented in the Proceedings of the Institute of Radio Engineers dated May 1952, pages 568 et seq. The advantage of the Broomall-Riebman divider is that it does not require feed back and operates from discrete samples of data, a requirement which admirably fits the discriminator of this invention.

FIG. 3 shows in some detail an operative circuit for the discriminator of FIG. 2. The details of multiplier 1, integrators 2 and 3 and divider 4 are shown by way of example only, since alternative circuits for performing the same functions may be employed. The multiplier, for example, comprises two pentodes 11 and 12 with two push-pull inputs connected, respectively, to signal input and the sweep input. The control grids are transformer coupled to the sweep voltage input through the center tapped transformer 13, while the suppresser grids of the pentodes are coupled, respectively, to the anode and cathode of triode 14. The load resistor 15 connected to the anode and the load resistor 16 connected to the cathode serve to drive the two suppressor grids in phase opposition. The circuit provides an output signal at the parallel-connected pentode anodes proportional to the video input voltage times the distance from the center of the raster. The output is zero at the center of the sweep, negative during the first half of the sweep and positive during the latter half of the sweep.

This product voltage, sx, moves into integrator 2, which includes a three stage amplifier with a condenser 24 coupled between input and output. The amplifier consists of two triode stages 21 and 22 and one pentode stage 23, and has a high loop gain. The input grid of the amplifier is clamped except during sweep generation. The output from the pentode amplifier stage is taken through an R-C coupling network and a double triode clamp in order that the initial level of the eventual output wave form is clamped to ground and is independent of the direct current characteristics of the amplifier. Circuit constants of integrator 2, where the triodes 21 and 22 are the two halves of a double triode 6SU7 and the pentode is of the 6AK5 type, may be as shown in FIG. 7.30 on page 284 of "Waveforms" by Chance, Hughes, etc., vol. 19, Radiation Laboratory Series, McGraw-Hill, 1949.

The video integrator 3 may be similar to the integrator 2. The input to the triode amplifiers 31 and 32 is directly coupled to the video input terminal, s, and the pentode amplifier 33 is coupled at its anode to the B terminal of the divider 4.

The divider circuit 4 comprises two sweep generators 41 and 42, a pick-off circuit 43, a blocking oscillator 44b, a clamp circuit 45, and a cathode follower 46. Ramp functions with amplitude proportional to the two input voltages are initiated in coincidence by the two sweep generators coupled in parallel to the unclamp terminal (B). When the ramp generated from the voltage at input B reaches a predetermined level, determined by the grid voltage of the pick-off amplifier 43a, the pick-off circuit generates a pulse firing the blocking oscillator. The time delay between the initiation of the ramp and the generation of the pulse is inversely proportional to the voltage at B. The blocking oscillator momentarily causes the clamp 45 to conduct, establishing on condenser 45a an output voltage equal to the instantaneous value of the A ramp. The output voltage is then proportional to A and inversely proportional to B. This output voltage is then proportional to the distance between the center of the signal and the center of the raster. This output represents the required correction in the X coordinate of the raster. For the other, or Y, coordinate the above described discriminator must be duplicated.

Figure 4:
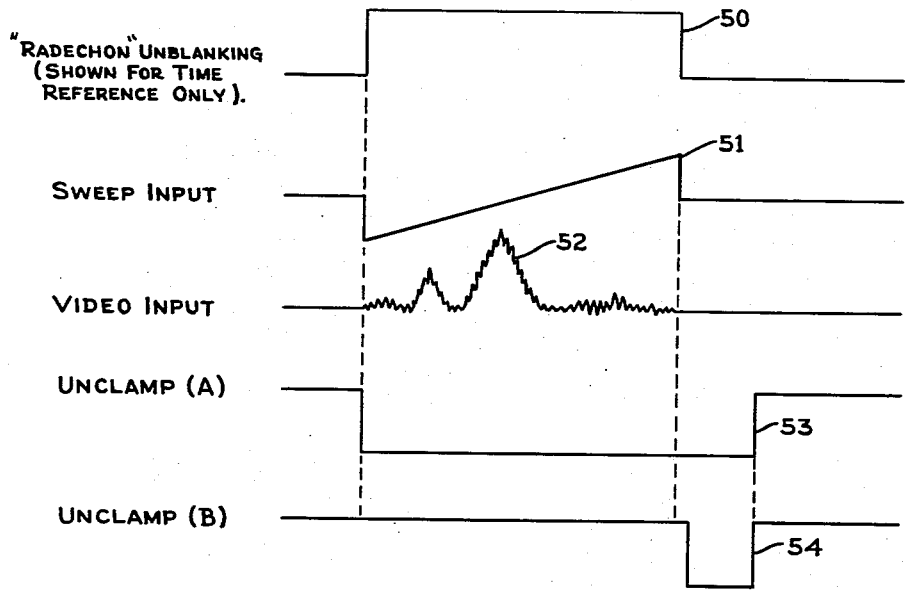
FIG. 4 is a waveform analysis of the discriminator of this invention.

The typical waveforms in FIG. 4 show the relative timing of the principal electrical operations in the circuits of FIG. 3. During an inspection cycle the electron beam of the "Radechon" is turned on by the Radechon unblanking signal 50 while sweep waveforms generate a small rectangular raster. Only one sweep 51 for the X coordinate is shown, a higher frequency sawtooth wave being used for the Y coordinate. The video reading signal 52 is produced in the read-out circuit of the storage tube during this unblanked time and is applied to the video input terminal, s, of FIG. 3. By triggering flip-flops or multivibrators from a common pulse source, not shown, the various blanking and unblanking waveforms can easily be kept in synchronism as suggested in FIG. 4. The integrators are operated by the unclamp (A) waveform 53 so that they integrate during the time of the video signal, and hold this result during the computation of the correction voltage. The unclamp (B) waveform 54 occurs after the Radechon unblanking and is used to generate the sweeps for the correction computation.

It is now apparent that regardless of how indistinct the boundaries of the video signal may be because of noise and distortion, the electrical center of the video return may be found and its displacement from null is accurately determined by the novel discriminator of this invention.

What is claimed is:

1. A system for determining the displacement in time of a video signal along a time-base from a predetermined point on the time-base, the system comprising, a source of video signals, a source of sawtooth sweep voltage linear with time beginning at a time corresponding to said predetermined point, a multiplier multiplying the video voltage by the sweep voltage at corresponding points in time, a first integrating circuit coupled to and integrating the product output of said multiplier, a second integrating circuit coupled directly to said video source, and a divider circuit coupled to the outputs of the two integrator circuits providing a signal corresponding to the ratio of the output of the first integrator divided by the output of the second integrator.

2. A system for determining the electrical center of a pulse signal of indistinct boundaries comprising means for sampling said pulse signal, means for generating a ramp voltage linear with time and synchronized with sampling of said pulse signal, means combining the ramp voltage and the sampled signal pulse voltage to produce a product voltage, an integrator for integrating the product voltage over a predetermined period of time coupled to the last named means, a second integrator for integrating the pulse signal voltage over said predetermined period of time, and circuit means dividing the value of the integration of the second integrator into the value of the integration of the first integrator.

References Cited in the file of this patent

UNITED STATES PATENTS

| | | |
|---|---|---|
| 2,671,608 | Hirsch | Mar. 9, 1954 |
| 2,747,796 | Patterson | May 29, 1956 |

OTHER REFERENCES

"Elements of the Differential and Integral Calculus" by Granville, Smith and Longley, revised edition, 1934, Ginn and Co., Boston, Mass., pages 320–321.